United States Patent
Sadot et al.

(10) Patent No.: US 7,406,524 B2
(45) Date of Patent: Jul. 29, 2008

(54) SECRET SESSION SUPPORTING LOAD BALANCER

(75) Inventors: Emek Sadot, Givatayim (IL); Itai Ephraim Zilbershtein, Petach-Tikva (IL)

(73) Assignee: Avaya Communication Isael Ltd., Tel Aviv (IL)

( * ) Notice: Subject to any disclaimer, the term of this patent is extended or adjusted under 35 U.S.C. 154(b) by 1212 days.

(21) Appl. No.: 09/915,609

(22) Filed: Jul. 26, 2001

(65) Prior Publication Data

US 2003/0023744 A1    Jan. 30, 2003

(51) Int. Cl.
*G06F 15/16* (2006.01)
(52) U.S. Cl. .......................... 709/227; 709/234; 726/22
(58) Field of Classification Search ................. 709/215, 709/223, 226, 249, 227, 234, 225; 726/22
See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 6,138,120 | A * | 10/2000 | Gongwer et al. | 707/10 |
| 6,611,498 | B1 * | 8/2003 | Baker et al. | 370/252 |
| 6,658,473 | B1 * | 12/2003 | Block et al. | 709/226 |
| 6,772,333 | B1 * | 8/2004 | Brendel | 713/153 |
| 6,807,580 | B2 * | 10/2004 | Freeman et al. | 709/249 |

* cited by examiner

*Primary Examiner*—Nathan Flynn
*Assistant Examiner*—Kyung H Shin
(74) *Attorney, Agent, or Firm*—Ryan, Mason & Lewis, LLP

(57) ABSTRACT

A method of load balancing messages to servers of a server farm, by a load balancer. The method includes configuring the load balancer with information on the session ID values which may be assigned by at least one of the servers, determining, by the load balancer, for at least some client messages including a non-empty session ID field, which server or subgroup of servers is associated with the ID in the ID field, responsive to the configured information, and selecting, by the load balancer, a server to receive each of the at least some client messages, at least partially responsive to the determination.

22 Claims, 3 Drawing Sheets

SECRET SESSION SUPPORTING LOAD BALANCER

FIELD OF THE INVENTION

The present invention relates to data communication networks and in particular to load balancing of packets in data networks.

BACKGROUND OF THE INVENTION

Web servers are commonly used to provide users, generally using a client computer, with information, and optionally to receive input from users. One protocol used for transmitting data between clients and Web servers is the HTTP (Hypertext transfer protocol) protocol. In the HTTP protocol, the client transmits to the server a request message that generally includes a uniform resource locator (URL) which indicates the file (or any other object) to which the request message pertains. The request message may be included in one or more packets, the first of which usually includes the URL. Responsive to the request message, the server transmits to the client a result message which includes the response of the server to the request.

The HTTP protocol generally operates over a transport protocol, e.g., TCP, which provides a connection between the client computer and the server.

In many cases, for example when providing credit card information, it is desired that the information transmitted between the client and server be encrypted to prevent eavesdroppers from extracting tangible information from the transmitted messages. One common encryption protocol is the secure sockets layer (SSL) protocol which mediates between application protocols (e.g., HTTP, FTP) and a transport protocol (e.g., TCP). Generally, when an SSL session is established, the client and server perform a negotiation phase, in which the client and server authenticate each other and negotiate an encryption algorithm and cryptographic keys. Data is transmitted in the SSL session between the server and client only after successful completion of the negotiation phase.

The negotiation phase of the SSL protocol is generally initiated by the client, which transmits an SSL "client hello" message to the server. During the negotiation phase, the server assigns the session an SSL session ID, which represents the SSL session.

The SSL protocol also defines a fast connection establishment process, which skips various security verification steps of the negotiation phase. In order to allow the fast connection establishment process, the server stores the SSL session ID assigned to negotiated sessions along with other information relating to the session, for a predetermined time after the termination of the session. If a client desires to establish an SSL connection based on an existing SSL ID, the client transmits an SSL "client hello" message to the server with the SSL session ID. A new SSL session is established by the client transmitting a "client hello" message which does not include a session ID value, for example states a zero field length in a session ID field. The ability to establish SSL connections, using the fast connection establishment process, is referred to herein as SSL persistency.

In versions 1 and 3 of the SSL protocol, the signals of the SSL negotiation phase are not encrypted and can be understood by intermediate units capturing the transmitted messages of the negotiation phase. The transmitted data, however, is encrypted and cannot be understood by intervening units.

Many Web sites are hosted by a plurality of servers, because of the large number of clients accessing the Web site, the large volume of the information carried by the Web site and/or for redundancy purposes. A load balancer receives the packets directed to the Web site and forwards them to a respective server based on one or more parameters. Load balancers are also used for other purposes, for example, for redirecting HTTP requests to a proxy cache.

If the advantage of SSL persistency is to be exploited, the load balancer should forward "client hello" messages belonging to a single client to the same server, as a different server will not necessarily have the information required for the SSL persistency of the client. One method used by load balancers to ensure that packets from a single client are forwarded to the same server is tracking the SSL session IDs of sessions handled by the load balancer. For each SSL session, the load balancer lists the session ID of the session and the address of the server to which the packets of the session were forwarded.

The storage space required for listing the SSL session IDs may be very large, substantially adding to the cost of the load balancer. In addition, the performance of the load balancer is degraded due to the need to search large lists of SSL session IDs or to manage sorted lists. Reducing the size of the SSL ID list would limit the effectiveness of SSL persistency. Furthermore, in some cases, the session ID of a session is changed during the encrypted session, and the load balancer is not aware of the change. In such cases, the load balancer will not find an entry in its list matching the session ID and the SSL persistency will be lost.

SUMMARY OF THE INVENTION

An aspect of some embodiments of the present invention relates to pre-assigning different groups of SSL session IDs to different servers in a server farm. A load balancer of the farm is updated with the assigned SSL session IDs of each server, and accordingly forwards packets with SSL session IDs to the correct server. Thus, there is no need to manage SSL persistency lists and the large memory requirements for such lists are not necessary.

Optionally, each server is assigned a range of numbers from which it may select session IDs to be assigned to sessions. Alternatively or additionally, one or more bits, optionally depending on the number of servers in the server farm, are used to indicate the identity of the assigning server, and the remaining bits are determined by the server. Further alternatively or additionally, each server is assigned a list of numbers from which to select session IDs it assigns to its clients.

In some embodiments of the invention, the pre-assigning of SSL session IDs is performed by a system manager. The system manager configures the servers and the load balancer with the session IDs. Alternatively or additionally, the pre-assigning of SSL session IDs is performed automatically by the servers and load balancer, using a suitable protocol.

There is therefore provided in accordance with some embodiments of the invention, a method of load balancing messages to servers of a server farm, by a load balancer, comprising configuring the load balancer with information on the session ID values which may be assigned by at least one of the servers, determining, by the load balancer, for at least some client messages including a non-empty session ID field, which server or sub-group of servers is associated with the ID in the ID field, responsive to the configured information, and selecting, by the load balancer, a server to receive each of the at least some client messages, at least partially responsive to the determination.

Optionally, configuring the load balancer comprises managing a table which lists for at least one of the servers or sub-groups of servers a range of values from which the server may assign session IDs and/or one or more values of a sub-set of the bits of session IDs associated with the server. Alternatively or additionally, configuring the load balancer comprises providing a function which correlates between session IDs and the server which assigned the session ID.

Optionally, the method includes configuring at least one of the servers with a rule on the session ID values it may assign to sessions. Optionally, configuring the load balancer comprises configuring through a user interface, which configures both the load balancer and at least one of the servers responsive to user instructions. Optionally, configuring the load balancer comprises configuring automatically, by a module running on the load balancer, which transmits configuration instructions to at least one of the servers.

Possibly, configuring automatically by the load balancer comprises configuring responsive to input received from the at least one of the servers. Optionally, configuring at least one of the servers comprises configuring substantially all the servers in the farm with respective sub-groups of allowed session IDs which do not include common session IDs.

Optionally, at least some of a plurality of available session IDs are not assigned to any of the servers. Optionally, configuring substantially all the servers comprises assigning substantially a same number of session IDs to each of the servers. Possibly, configuring substantially all the servers comprises assigning different numbers of session IDs to at least two of the servers. Optionally, configuring the load balancer comprises configuring by a system manager. Optionally, selecting a server to receive a client message comprises selecting a server which assigned the session ID of the message. Alternatively or additionally, selecting a server to receive a client message comprises selecting a server in a sub-group of servers which shares information with a server which assigned the session ID of the message.

Optionally, the client messages comprise SSL client messages. Optionally, the session ID values comprise application layer ID values. Optionally, the method additionally includes managing a list of ID values actually assigned by one or more servers and determining, by the load balancer, for at least some client messages including a non-empty session ID field, which server or sub-group of servers is associated with the ID in the ID field, responsive to the managed list.

There is further provided in accordance with some embodiments of the invention, a load balancer, comprising a memory unit adapted to store configured information on session ID values which may be assigned by at least one of the servers, an input interface adapted to receive client messages, and a load balancing unit which is adapted to select a server to receive at least one of the client messages, at least partially responsive to the contents of the memory unit, and to forward the at least one of the client messages to the selected server.

Possibly, the load balancer includes a configuration module adapted to store the configured information in the memory unit. Optionally, the configuration module is adapted to generate instructions directed to one or more servers on the session ID values they may use.

Optionally, the load balancing unit comprises a comparator adapted to compare at least a portion of at least one of the fields of received client messages to information stored in the memory unit.

BRIEF DESCRIPTION OF FIGURES

Particular exemplary embodiments of the invention will be described with reference to the following description of embodiments in conjunction with the figures, wherein identical structures, elements or parts which appear in more than one figure are preferably labeled with a same or similar number in all the figures in which they appear, in which.

DETAILED DESCRIPTION OF EMBODIMENTS

Figure 1:
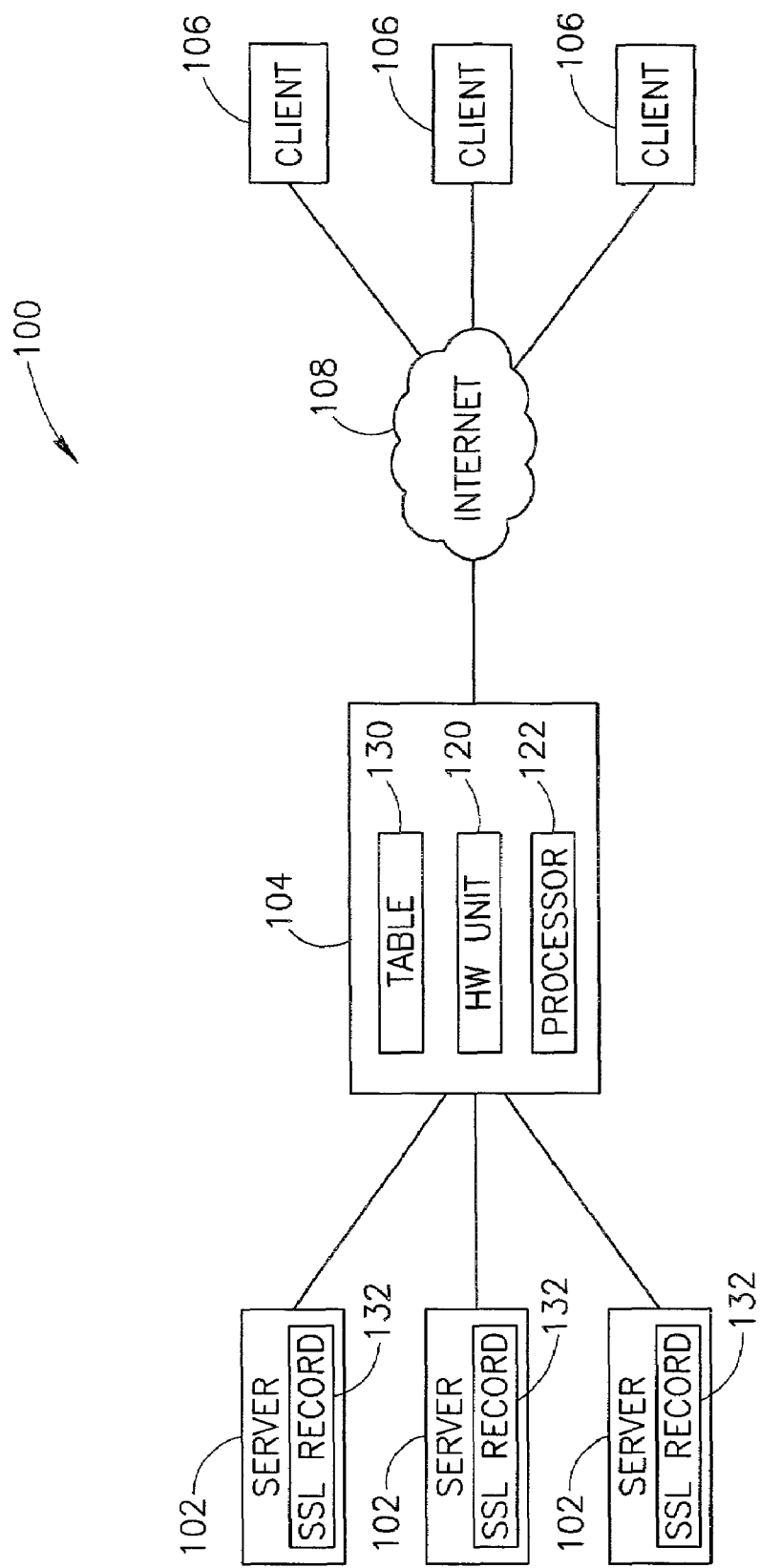
FIG. 1 is a schematic block diagram of a server farm, in accordance with an embodiment of the present invention.

FIG. 1 is a schematic block diagram of a server farm 100, in accordance with an embodiment of the present invention.

Server farm 100 comprises a plurality of servers 102 which host pages of one or more Web sites. Client computers 106 forward request messages to server farm 100, for example through the Internet 108. A load balancer 104 receives the messages directed from clients 106 to server farm 100 and forwards each of the messages to one of servers 102, which is selected according to substantially any load balancing method. Response packets from servers 102 are optionally sent to load balancer 104, which forwards the response packets to the client 106. Load balancer 104 optionally operates in a splicing mode, in which it generates separate TCP connections with clients 106 and servers 102.

In some embodiments of the invention, load balancer 104 comprises a hardware unit 120 which handles standard format packets and a processor 122 which handles non-standard packets and configures hardware unit 120. Alternatively, load balancer 104 is implemented entirely in software or entirely in hardware. In some embodiments of the invention, load balancer 104 is implemented using a programmable hardware unit.

In some embodiments of the invention, load balancer 104 includes a table 130, optionally stored in a memory module of the load balancer, which lists the range of SSL session IDs assigned to each of servers 102. Alternatively or additionally, table 130 lists, for each server 102, the session ID numbers assigned to that server. Further alternatively or additionally, a sub-group of bits of the session IDs is used to identify the server 102 to which the session ID was assigned. Table 130 optionally lists for each server 102, the value of the sub-group of bits corresponding to the server. In some embodiments of the invention, one of the servers is considered a default server, which receives packets having IDs not matching any of the entries of table 130.

In some embodiments of the invention, each of servers 102 includes a record 132 which identifies the SSL session IDs that may be used by the server in identifying SSL sessions. Record 132 may include a list of allowed numbers, an allowed range and/or one or more mandatory values of specific bits in session IDs that may be assigned by the specific server 102 to SSL sessions.

In some embodiments of the invention, the contents of table 130 and records 132 are configured by a human system manager who ensures that the values are compatible. Optionally, load balancer 104 and/or servers 102 include user friendly interfaces which allow easy configuration of table 130 and/or records 132. Alternatively or additionally, the system manager configures servers 102 and an automatic program configures load balancer 104 accordingly, or the system manager configures load balancer 104 and an automatic program configures servers 102 accordingly.

Alternatively or additionally, a single user interface on load balancer 104 and/or one of servers 102 is used to configure load balancer 104 and servers 102 together. A user enters information to the user interface, which automatically configures load balancer 104 and servers 102 accordingly. Optionally, the system manager provides the user interface with the number of servers 102 in farm 100 and the IP addresses of the servers and the user interface automatically configures load balancer 104 and servers 102 accordingly. In some embodiments of the invention, the user may also indicate the maximal number of session IDs to be assigned to each of servers 102 and/or the percentage of session IDs to be assigned to each server 102. Optionally, the range of session IDs are distributed evenly between servers 102, unless other instructions are specifically configured. Further alternatively or additionally, the contents of table 130 and records 132 are configured automatically, for example as described below with reference to FIG. 3.

Figure 2:
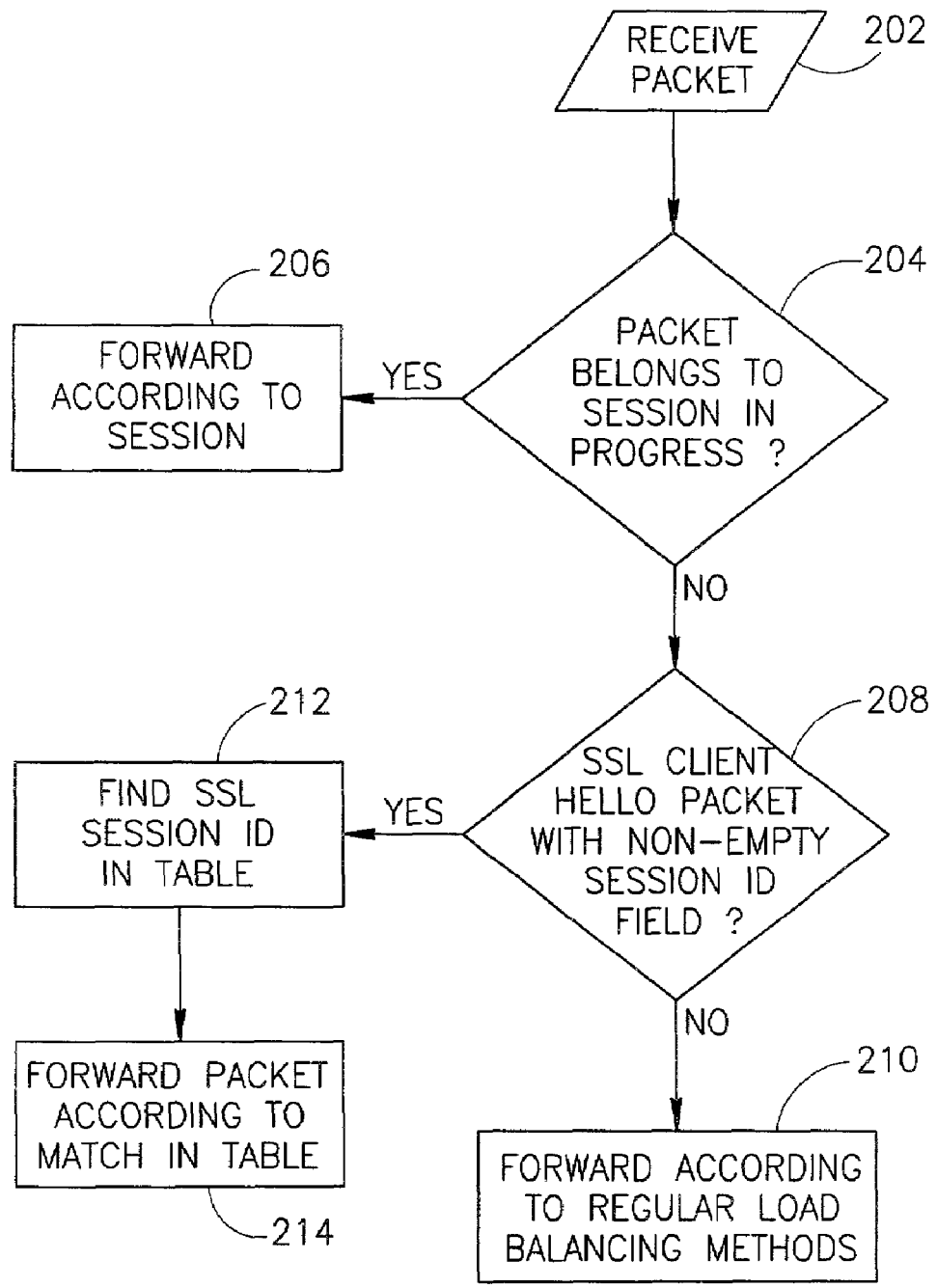
FIG. 2 is a flowchart of the acts performed by a load balancer in determining to which server to forward a packet, in accordance with an embodiment of the present invention.

FIG. 2 is a flowchart of the acts performed by load balancer 104 in determining to which server 102 to forward a packet, in accordance with an embodiment of the present invention. When a packet is received (202) by load balancer 104, the load balancer determines (204) whether the packet belongs to a session in progress currently handled by the load balancer, as is known in the art. If (204) the packet belongs to a session in progress, the packet is forwarded (206) to a server 102 previously selected for the session, using any method known in the art. If (204) the packet belongs to a new session, load balancer 104 determines (208) whether the packet comprises an SSL "client hello" message which includes an SSL session ID, i.e., has a non-empty session ID field.

If (208) the packet does not comprise an SSL "client hello" message which includes an SSL session ID, the packet is handled (210) according to load balancing methods known in the art, for example, according to the source IP address of the packet and/or using round robin and/or hashing methods. If (208) the packet comprises an SSL "client hello" message which includes an SSL session ID, load balancer 104 finds (212) the SSL session ID of the packet in table 130, and accordingly determines the server 102 which corresponds to, e.g., assigned, the session ID. Load balancer 104 then forwards (214) the packet to the server 102 corresponding to the session ID. In some embodiments of the invention, if the session ID in the SSL "client hello" message is not included in any of the listings of table 132, the message is forwarded to a predetermined server 102 or to a server 102 selected according to load balancing methods known in the art.

In some embodiments of the invention, servers 102 are organized in sub-groups, which share SSL session ID information, such that session IDs assigned by one of the servers 102 in the sub-group is known to the other servers 102 in the sub-group. Optionally, in some of these embodiments, the servers 102 of each sub-group have a common record 132 and a common entry in table 130. When an SSL "client hello" message, which includes an SSL session ID corresponding to a sub-group, is received by load balancer 104, the load balancer 104 selects one of servers 102 to receive the packet from the servers of the sub-group corresponding to the ID, according to non-SSL load balancing methods. Alternatively or additionally, load balancer 104 selects a specific one of the servers 102 in the group, according to the SSL ID in the packet, for example the server 102, which initially assigned the ID. In this alternative, table 130 optionally indicates a specific server 102 for each session ID, although more than one of servers 102 correspond to some of the IDs.

In some embodiments of the invention, determining whether a packet comprises an SSL "client hello" message which includes an SSL session ID comprises determining if the packet is an SSL packet, if the SSL packet is a hello message and if the length sub-field of the SSL session ID of the SSL packet is non-zero. Optionally, determining if the packet is an SSL packet comprises examining the destination port of the packet. In some embodiments of the invention, determining whether an SSL packet comprises a "client hello" message comprises selecting the first SSL packet passing on a TCP session directed to an SSL port. Optionally, load balancer 104 verifies that the first packet on the SSL session has a standard structure of "client hello" messages.

In some embodiments of the invention, the method of FIG. 2 is carried out by hardware unit 120. Optionally, hardware unit 120 compares packets with a standard structure to a mask, which identifies SSL "client hello" packets which include an SSL session ID. Packets with a non-standard structure, e.g., which include IP and/or TCP option fields, are optionally forwarded to processor 122 which carries out one or more of the acts of the method of FIG. 2.

In some embodiments of the invention, in addition to listing in table 130 the session IDs, which may be assigned by each server, load balancer 104 keeps track of the session IDs actually assigned by servers 102. Optionally, when a "client hello" packet with a session ID is received, the session ID is compared to a list of actually assigned IDs. Only if a match is not found, the session ID is compared to table 130.

Alternatively or additionally, table 130 does not include information on all of servers 102 and/or does not include complete information for all the session IDs. As described above, when a packet for which load balancer 104 does not include information on its session ID, needs to be forwarded, load balancer 104 selects a server 102 according to any suitable load balancing method. If the selected server 102 does not recognize the session ID of the packet, a new SSL negotiation phase will be performed. As long as such cases are rare, the performance of farm 100 will not seriously be degraded.

In some embodiments of the invention, each of servers 102 and load balancer 104 runs a configuration module which performs a distributed configuration process for table 130 and records 132, for example as is now described with reference to FIG. 3.

Figure 3:
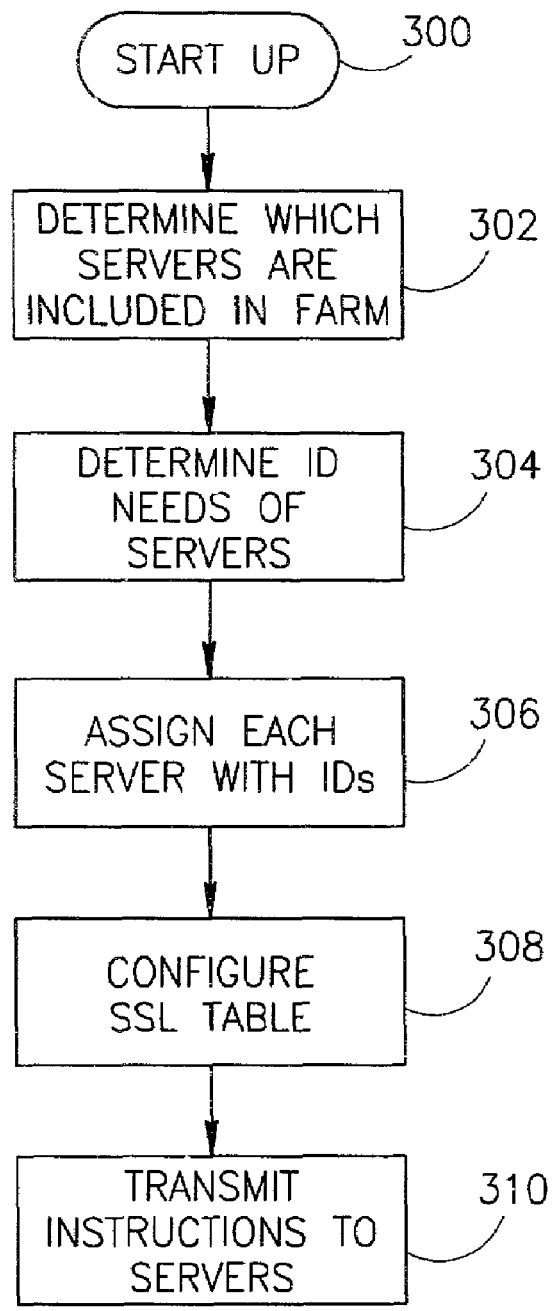
FIG. 3 is a flowchart of the acts performed by a load balancer and one or more servers in assigning SSL session IDs, in accordance with an embodiment of the present invention.

FIG. 3 is a flowchart of the acts performed by load balancer 104 and servers 102 in assigning SSL session IDs, in accordance with an exemplary embodiment of the present invention. At start up (300) of load balancer 104, load balancer 104 determines (302) which servers 102 are included in farm 100. Load balancer 104 optionally also determines (304) the session ID needs of each of the servers 102 in farm 100. According to the determined needs, load balancer 104 assigns (306) a group of session ID values to each of servers 102. Load balancer 104 configures (308) table 130 accordingly and transmits (310) configuration instructions to the configuration modules of servers 102. Optionally, the configuration modules of servers 102 configure their respective records 132, accordingly.

Alternatively or additionally to performing the configuration process at start-up of load balancer 104, the configuration process is performed periodically and/or when there is a change in the number of operative servers 102 in farm 100. When the configuration process is performed during the operation of farm 100, the process may involve re-assignment of SSL session IDs from one server 102 to another. Optionally, the configuration process attempts to minimize the re-assignment of SSL session IDs. Alternatively or additionally, the configuration process includes receiving from servers 102 a list of ID numbers currently in use and these numbers are not re-assigned.

Further alternatively or additionally, load balancer 104 distributes its re-assignment instruction in two stages. In a first stage, load balancer 104 instructs one or more of servers 102 to stop assigning session IDs in a range to be confiscated from the server. Optionally, the instruction to stop assigning session IDs includes a notification of an expiration time of the previously assigned session IDs. When all the previously assigned session IDs in the range to be confiscated are canceled or expire, server 102 notifies load balancer 104, which, in a second stage, allows a different server 102 to use the confiscated range. Alternatively or additionally, load balancer 104 distributes its re-assignment instructions with an explicit or implicit time at which the re-assignment takes effect. During this time, servers 102 must renegotiate with their clients 106 changing of session IDs to be confiscated.

Further alternatively or additionally, load balancer 104 manages an exception table in which specific session IDs which are assigned to different servers 102 than the ranges to which they belong as listed in table 132, are listed. Optionally, load balancer 104 receives notification of such exceptions from servers 102 from which ID ranges are confiscated and notifies servers 102 receiving confiscated session ID ranges. In some embodiments of the invention, servers 102 from which ranges were confiscated provide update lists of exceptions, until the exception list is empty. Accordingly, load balancer 104 optionally periodically updates the servers 102 receiving the ranges of the updated exception lists.

In some embodiments of the invention, in assigning session IDs to servers 102 of a farm 100, a range of spare IDs are kept unassigned, for use if additional servers 102 are added to farm 100 or if one or more servers needs additional IDs during operation.

In some embodiments of the invention, the session IDs are assigned with an expiration time. A method of assigning new session IDs is performed toward the expiration time.

Referring in more detail to determining (302) which servers 102 are included in farm 100, optionally the determination is performed based on configuration and/or testing information gathered without relation to the configuration of table 130. Alternatively or additionally, load balancer 104 transmits hello signals to determine which servers 102 are included in farm 100. In some embodiments of the invention, the responses to the hello signals include information on the session ID needs of the servers 102. The information on session ID needs optionally includes the maximal number of TCP sessions a server 102 can receive, the percentage of SSL sessions the server 102 generally receives and/or the duration for which assigned SSL session IDs are stored. Alternatively or additionally, the SSL session ID needs are determined from the load balancing rules of load balancer 104.

Alternatively to load balancer 104 transmitting instructions to servers 102 (310), the IDs are configured in servers 102 independent of load balancer 104, either automatically or by a human. Thereafter, load balancer 104 automatically determines the IDs assigned to each server 102 and accordingly configures table 130. Optionally, servers 102 run modules which carry out a distributed algorithm for assigning the IDs.

Alternatively or additionally to using table 130, load balancer 104 stores an algorithm or other process which it uses to determine to which server each session ID corresponds. For example, load balancer 104 may use a hashing process or a user configured function to determine from a received session ID, which server 102 generated the ID. Alternatively or additionally, servers 102 have predetermined processes for selecting the session IDs they assign to SSL sessions and load balancer 104 follows these processes. For example, load balancer 104 may be configured with the random seeds and functions used by each of servers 102 in generating the session IDs they assign.

It is noted that although the above description relates to the SSL protocol, the principals of the present invention may be used for other protocols that assign session IDs which are used for more than a single session. In such protocols, the session IDs may appear in other messages than described above (e.g., other than "client hello" messages).

It will be appreciated that the above described methods may be varied in many ways, including, changing the order of steps, and/or performing a plurality of steps concurrently. For example, in the method of FIG. 2, load balancer 104 may first identify (208) whether packets are SSL hello messages which include a session ID and only then determine (204) whether the packet belongs to a session in progress. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of load balancing messages to servers of a server farm, by a load balancer, comprising:
   configuring the load balancer with information specifying a pre-assignment of different groups of session ID values to respective ones of the servers, each of said servers being operative to assign session ID values from its associated one of the pre-assigned groups to sessions handled by that server;
   determining, by the load balancer, for at least some client messages including a non-empty session ID field, which server or sub-group of servers is associated with the ID in the ID field, responsive to the configured information; and
   selecting, by the load balancer, a server to receive each of the at least some client messages, at least partially responsive to the determination.

2. A method according to claim 1, wherein configuring the load balancer comprises managing a table which lists for at least one of the servers or sub-groups of servers a range of values from which the server may assign session IDs.

3. A method according to claim 1, wherein configuring the load balancer comprises managing a table which lists for at least one of the servers or sub-groups of servers, one or more values of a sub-set of the bits of session IDs associated with the server.

4. A method according to claim 1, wherein configuring the load balancer comprises providing a function which correlates between session IDs and the server which assigned the session ID.

5. A method according to claim 1, comprising configuring at least one of the servers with a rule on the session ID values it may assign to sessions.

6. A method according to claim 5, wherein configuring the load balancer comprises configuring through a user interface, which configures both the load balancer and at least one of the servers responsive to user instructions.

7. A method according to claim 5, wherein configuring the load balancer comprises configuring automatically by a module running on the load balancer, which transmits configuration instructions to at least one of the servers.

8. A method according to claim 7, wherein configuring automatically by the load balancer comprises configuring responsive to input received from the at least one of the servers.

9. A method according to claim 5, wherein configuring at least one of the servers comprises configuring substantially all the servers in the farm with respective sub-groups of allowed session IDs which do not include common session IDs.

10. A method according to claim 9, wherein at least some of a plurality of available session IDs are not assigned to any of the servers.

11. A method according to claim 9, wherein configuring substantially all the servers comprises assigning substantially a same number of session IDs to each of the servers.

12. A method according to claim 9, wherein configuring substantially all the servers comprises assigning different numbers of session IDs to at least two of the servers.

13. A method according to claim 1, wherein configuring the load balancer comprises configuring by a system manager.

14. A method according to claim 1, wherein selecting a server to receive a client message comprises selecting a server which assigned the session ID of the message.

15. A method according to claim 1, wherein selecting a server to receive a client message comprises selecting a server in a sub-group of servers which shares information with a server which assigned the session ID of the message.

16. A method according to claim 1, wherein the client messages comprise SSL client messages.

17. A method according to claim 1, wherein the session ID values comprise application layer ID values.

18. A method according to claim 1, additionally comprising managing a list of ID values actually assigned by one or more servers and determining, by the load balancer, for at least some client messages including a non-empty session ID field, which server or sub-group of servers is associated with the ID in the ID field, responsive to the managed list.

19. A load balancer, comprising:
a memory unit adapted to store configured information specifying a pre-assignment of different groups of session ID values to respective ones of the servers, each of said servers being operative to assign session ID values from its associated one of the pre-assigned groups to sessions handled by that server;
an input interface adapted to receive client messages; and
a load balancing unit which is adapted to select a server to receive at least one of the client messages, at least partially responsive to the contents of the memory unit, and to forward the at least one of the client messages to the selected server.

20. A load balancer according to claim 19, comprising a configuration module adapted to store the configured information in the memory unit.

21. A load balancer according to claim 20, wherein the configuration module is adapted to generate instructions directed to one or more servers on the session ID values they may use.

22. A load balancer according to claim 19, wherein the load balancing unit comprises a comparator adapted to compare at least a portion of at least one of the fields of received client messages to information stored in the memory unit.

* * * * *